United States Patent
Hashimoto et al.

(10) Patent No.: US 11,798,739 B2
(45) Date of Patent: Oct. 24, 2023

(54) SAMARIUM-IRON-NITROGEN BASED MAGNET POWDER AND METHOD OF MANUFACTURING SAME, AND SAMARIUM-IRON-NITROGEN BASED MAGNET AND METHOD OF MANUFACTURING SAME

(71) Applicants: Ryuji Hashimoto, Tokyo (JP); Yasushi Enokido, Tokyo (JP); Shusuke Okada, Aichi (JP); Kenta Takagi, Aichi (JP)

(72) Inventors: Ryuji Hashimoto, Tokyo (JP); Yasushi Enokido, Tokyo (JP); Shusuke Okada, Aichi (JP); Kenta Takagi, Aichi (JP)

(73) Assignee: TDK Corporation, Tokyo (JP)

( * ) Notice: Subject to any disclaimer, the term of this patent is extended or adjusted under 35 U.S.C. 154(b) by 108 days.

(21) Appl. No.: 17/042,443

(22) PCT Filed: Mar. 27, 2019

(86) PCT No.: PCT/JP2019/013316
§ 371 (c)(1),
(2) Date: Sep. 28, 2020

(87) PCT Pub. No.: WO2019/189440
PCT Pub. Date: Oct. 3, 2019

(65) Prior Publication Data
US 2021/0082605 A1    Mar. 18, 2021

(30) Foreign Application Priority Data
Mar. 29, 2018   (JP) ................................. 2018-065356

(51) Int. Cl.
*H01F 1/059*     (2006.01)
*H01F 41/02*    (2006.01)
(Continued)

(52) U.S. Cl.
CPC ............ *H01F 41/0266* (2013.01); *B22F 1/00* (2013.01); *H01F 1/059* (2013.01); *H01F 41/02* (2013.01); *B22F 10/32* (2021.01)

(58) Field of Classification Search
None
See application file for complete search history.

(56) References Cited

U.S. PATENT DOCUMENTS

2018/0226180 A1     8/2018   Kawashita et al.
2019/0006068 A1 *   1/2019   Sakuma ................ C22C 38/005
2019/0333661 A1 *  10/2019   Takagi .................... H01F 1/065

FOREIGN PATENT DOCUMENTS

JP    2015-098623    5/2015
JP    2015-142119    8/2015
(Continued)

OTHER PUBLICATIONS

Otogawa, Journal of Alloys and Compounds, vol. 746, p. 19-26. (Year: 2018).*

(Continued)

*Primary Examiner* — Xiaowei Su
(74) *Attorney, Agent, or Firm* — IPUSA, PLLC

(57) ABSTRACT

One embodiment of the present invention includes, in a samarium-iron-nitrogen based magnet powder, a main phase containing samarium and iron, and a sub-phase containing samarium, iron, and at least one or more elements selected from the group consisting of zirconium, molybdenum, vanadium, tungsten, and titanium, wherein an atomic ratio of a rare earth element to an iron group element is greater than an atomic ratio of the rare earth element to the iron group element of the main phase, wherein at least a part of a surface of the main phase is coated with the sub-phase.

8 Claims, 2 Drawing Sheets

(51) Int. Cl.
　　　*B22F 1/00*　　　(2022.01)
　　　*B22F 10/32*　　　(2021.01)

(56) References Cited

FOREIGN PATENT DOCUMENTS

| JP | 2016-207678 | 12/2016 |
| WO | 2017/033266 | 3/2017 |
| WO | 2018/163967 | 9/2018 |

OTHER PUBLICATIONS

Otogawa, Journal of the Korean Physical Society, vol. 72, p. 716-725. Published on Mar. 22, 2018.*
Matsumiya, Anal. Chem. vol. 77, p. 5344-5348. (Year: 2005).*
Abiko, Phys. Stat. Sol., vol. 167, p. 347-355. (Year: 1998).*
International Search Report for PCT/JP2019/013316 dated Jun. 18, 2019.
Office Action dated Jun. 7, 2023 with respect to the corresponding Chinese application No. 201980023125.7.

* cited by examiner

SAMARIUM-IRON-NITROGEN BASED MAGNET POWDER AND METHOD OF MANUFACTURING SAME, AND SAMARIUM-IRON-NITROGEN BASED MAGNET AND METHOD OF MANUFACTURING SAME

TECHNICAL FIELD

The present disclosure relates to a samarium-iron-nitrogen based magnet powder and a method of manufacturing the same, and a samarium-iron-nitrogen based magnet and a method of manufacturing the same.

BACKGROUND ART

A samarium-iron-nitrogen magnet is expected to be a high-performance magnet because it has a high Curie temperature of 477° C., a small temperature change in magnetic characteristics, and a very high anisotropic magnetic field of 20.6 MA/m, which is the theoretical value of coercive force.

Here, a samarium-iron-nitrogen magnet powder must be sintered to produce a high-performance magnet.

However, there is a problem that the coercive force of the samarium-iron-nitrogen magnet powder decreases even when it is heat-treated at a temperature lower than 620° C., which is the decomposition temperature.

Patent Document 1 discloses a method in which Zr is coated on the surface of a $Sm_2Fe_{17}$ alloy powder, heat treated to form a $ZrFe_2$ layer on the surface of the powder, and then nitrided in a magnetic field to form an $Sm_2Fe_{17}N_3$ alloy powder.

PRIOR ART DOCUMENTS

Patent Documents

Patent Document 1: Japanese Patent Application Publication No. 2015-142119

SUMMARY OF THE INVENTION

Problem to be Solved by the Invention

However, the $Sm_2Fe_{17}N_3$ alloy powder in which the $ZrFe_2$ layer is formed on the surface has a low coercive force after a heat treatment.

One embodiment of the invention is to provide a samarium-iron-nitrogen based magnet powder having a high coercive force after a heat treatment.

Means for Solving the Problem

An aspect of the present invention includes, in a samarium-iron-nitrogen based magnet powder, a main phase containing samarium and iron; and a sub-phase containing samarium, iron, and at least one or more elements selected from the group consisting of zirconium, molybdenum, vanadium, tungsten, and titanium, wherein an atomic ratio of a rare earth element to an iron group element is greater than an atomic ratio of the rare earth element to the iron group element of the main phase, wherein at least a part of a surface of the main phase is coated with the sub-phase.

Advantageous Effect of the Invention

According to an embodiment of the invention, a samarium-iron-nitrogen based magnet powder having high coercive force after a heat treatment can be provided.

EMBODIMENTS FOR CARRYING OUT THE INVENTION

Figure 1:
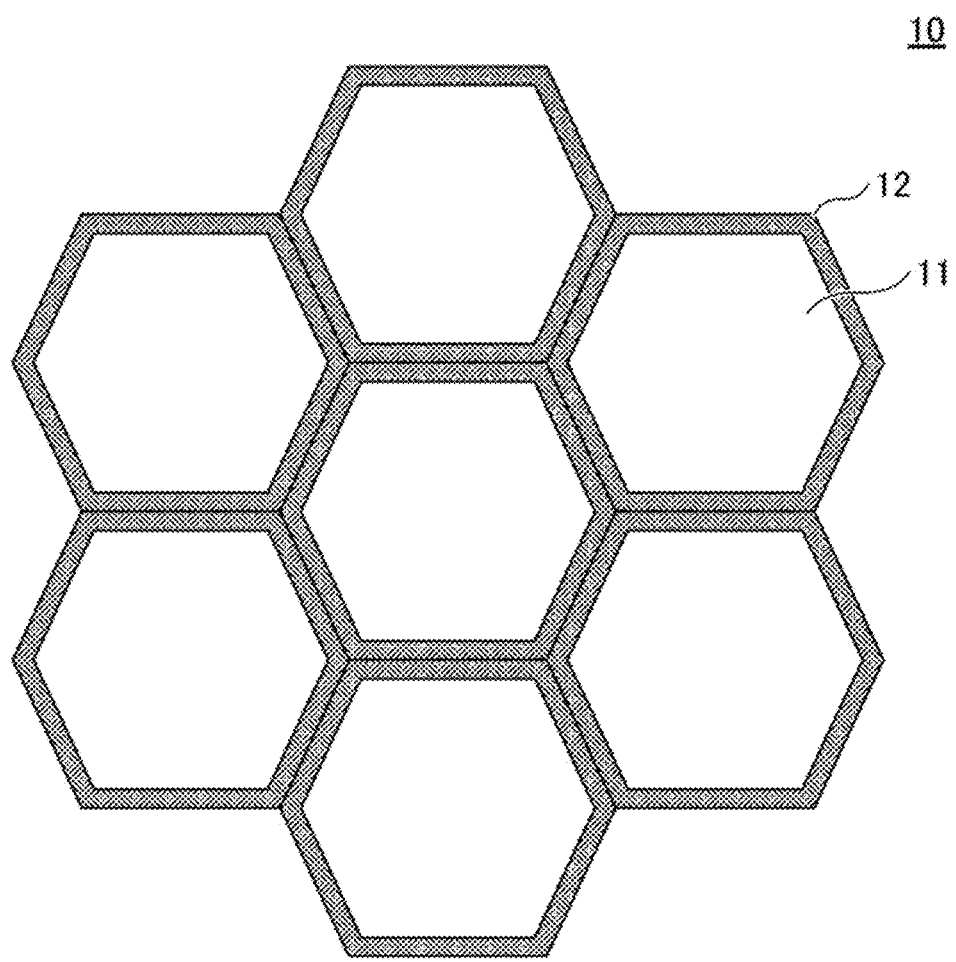
FIG. 1 is a schematic diagram showing an example of a samarium-iron-nitrogen based magnet according to the present embodiment.

Hereinafter, embodiments of the present invention will be described. The present invention is not limited to the contents described in the following embodiments. Also, the components described below include those that can be readily envisioned by a person skilled in the art and those that are substantially the same. In addition, the components described below may be properly combined with each other.

[Samarium-Iron-Nitrogen Based Magnet Powder]

A samarium-iron-nitrogen based magnet powder of the present embodiment contains a main phase containing samarium and iron, and a sub-phase containing samarium, iron, and one or more elements selected from the group consisting of zirconium, molybdenum, vanadium, tungsten, and titanium, wherein an atomic ratio of a rare earth element to an iron group element is greater than an atomic ratio of the rare earth element to an iron group element of the main phase, wherein at least a part of the surface of the main phase is coated with the sub-phase. Therefore, the samarium-iron-nitrogen based magnet powder according to the present embodiment has a high coercive force after a heat treatment.

The samarium-iron-nitrogen based magnet powder means a magnet powder containing samarium, iron, and nitrogen.

It is preferable that the atomic ratio of the rare-earth element to the iron group element of the sub-phase is 0.15 or more from the viewpoint of the non-magnetization of the sub-phase. However, it is preferable that the atomic ratio of the rare-earth element to the iron group element of the sub-phase be 0.20 or more because the soft magnetic phase of $SmFe_5$ is difficult to precipitate. In addition, the atomic ratio of the rare-earth element to the iron group element of the sub-phase is preferably 0.50 or more, and further preferably 1.00 or more because the coercive force after the heat treatment further improves.

Here, the sub-phase is considered to improve the magnetic coercive force after the heat treatment because the oxidation resistance improves when zirconium is added to the samarium-rich phase as described below. The reason for this is uncertain, but zirconium is believed to be an element that is less reactive and forms a passive layer. It should be noted that high performance magnets can be produced by using the samarium-iron-nitrogen based magnet powder with high coercive force after a heat treatment.

Aluminum, chromium and the like are known as elements that form the passive layer other than zirconium. However, the coercive force of the samarium-iron-nitrogen based magnet powder after a heat treatment does not improve by using these elements. This is considered to be due to the facts that an intermetallic compound other than the samarium-rich phase is formed and that a uniform sub-phase is not formed because the melting point is high.

The state diagram of samarium and zirconium, and that of iron and zirconium are eutectic, and the liquid phase containing samarium, iron, and zirconium is considered to be easily mixed. The fact that zirconium is an element suitable for the sub-phase is thought to be due to this chemical property.

Additionally, molybdenum, vanadium, tungsten, and titanium can be added to the sub-phase in place of or with zirconium to provide an effect of increasing the coercive force after the heat treatment.

The samarium-iron-nitrogen based magnet powder has at least a part of the surface of the core having the core-shell structure, that is, including the main phase, and a sub-phase as a shell.

The sub-phase thickness is typically in the range of about 1 nm to about 100 nm.

The surface coverage of the main phase by the sub-phase is preferably 10% or more, and further preferably 50% or more. If the surface coverage of the main phase by the sub-phase is 10% or more, the coercive force is further improved after the heat treatment of the samarium-iron-nitrogen based magnet powder.

The sub-phase may include elements other than samarium, iron, and zirconium, preferably less than the ratio of the elements of samarium, iron, and zirconium.

The main phase crystal structure of the samarium-iron-nitrogen based magnet powder may be either $Th_2Zn_{17}$ structure or $TbCu_7$ structure, but the crystal structure is preferably $Th_2Zn_{17}$ structure. This further improves the coercivity after the heat treatment of the samarium-iron-nitrogen based magnet powder.

Also, the samarium-iron-nitrogen based magnet powder may further comprise a phase other than the sub-phase.

Here, the amount of samarium is more excessively added than the stoichiometric ratio when manufacturing the samarium-iron-nitrogen based magnet powder, because the magnetic property decreases when it contains a large amount of soft magnetic iron.

The samarium-iron-nitrogen based magnet powder may further include rare earth elements other than samarium, such as neodymium, praseodymium, and iron group elements other than iron, such as cobalt. The content of rare earth elements other than samarium in all rare earth elements and the content of iron group elements other than iron in all iron group elements are preferably less than 30 at % in terms of anisotropic magnetic field and magnetization.

The average particle size of the samarium-iron-nitrogen based magnet powder is not more than 1.0 μm. When the average particle diameter of the samarium-iron-nitrogen based magnet powder is not more than 1.0 μm, the specific surface area of the samarium-iron-nitrogen based magnet powder increases, and the effect of the sub-phase is easily obtained. As a result, the magnetic coercive force further improves after the heat treatment of the samarium-iron-nitrogen based magnet powder.

As described below, because the sub-phase of the samarium-iron-nitrogen based magnet powder is formed by reducing and diffusing under an inert gas atmosphere, the oxygen content of the samarium-iron-nitrogen based magnet powder is normally 1.2% or less by mass.

As described below, because the samarium-iron-nitrogen based magnet powder is washed with a solvent capable of dissolving the calcium compound, the oxygen content of the samarium-iron-nitrogen based magnet powder is normally 0.8% or more by mass or more. When the sub-phase contains one or more elements selected from the group consisting of zirconium, molybdenum, vanadium, tungsten, and titanium, the oxidation resistance of the samarium-iron-nitrogen based magnet powder increases, and the oxygen content in the samarium-iron-nitrogen based magnet powder can be within an appropriate range by forming the passive layer of these elements.

[Method of Manufacturing Samarium-Iron-Nitrogen Based Magnet Powder]

A method of manufacturing a samarium-iron-nitrogen based magnet powder in accordance with the present embodiment includes the steps of: producing a samarium-iron based alloy powder by a reduction-diffusion technique of a precursor powder of a samarium-iron based alloy under an inert gas atmosphere (hereinafter, referred to as a first reduction-diffusion); reduction-diffusion of a mixture of the samarium-iron based alloy powder and one or more compounds selected from the group consisting of a zirconium compound, a molybdenum compound, a vanadium compound, a tungsten compound, and a titanium compound under an inert gas atmosphere (hereinafter, referred to as a second reduction-diffusion); nitriding a samarium-iron based alloy powder in which a sub-phase has been formed; and washing the nitrided samarium-iron based alloy powder (the crude product of the samarium-iron-nitrogen based magnet powder) with a solvent capable of dissolving the calcium compound. Here, by forming the sub-phase before nitriding the samarium-iron-based alloy powder, it is possible to prevent the decomposition of the main phase and the deterioration of the magnetic property. In addition, by reduction-diffusion under an inert gas atmosphere to form a sub-phase, the oxygen content in the samarium-iron-nitrogen based magnet powder is reduced, and the coercive force is improved after a heat treatment of the samarium-iron-nitrogen based magnet powder.

Inert gases include argon and the like. Here, in order to control the nitriding amount of the samarium-iron-nitrogen based magnet powder, it is preferable not to use nitrogen gas during reduction-diffusion process.

In addition, the concentration of oxygen in the inert gas atmosphere is preferably controlled to 1 ppm or less by a gas purifier and the like.

Hereinafter, a method of manufacturing a samarium-iron-nitrogen based magnet powder according to the present embodiment will be described specifically.

[Precursor Powder of Samarium-Iron Based Alloy]

As the precursor powder of the samarium-iron based alloy, if a samarium-iron based alloy powder can be produced by reduction-diffusion process, the precursor powder may include the samarium-iron based oxide powder, the samarium-iron based hydroxide powder and the like, and two or more kinds of combination may be used.

Hereinafter, the samarium-iron based oxide powder and/or the samarium-iron based hydroxide powder is referred to as the samarium-iron based (hydr)oxide powder.

The samarium-iron based alloy powder means an alloy powder containing samarium and iron.

The samarium-iron (hydr)oxide powder may be produced by a coprecipitation method. Specifically, a precipitating agent, such as alkali, is added to a solution containing samarium salt and iron salt to precipitate a samarium-iron compound (mainly hydroxide), and the precipitate is recovered by filtration, centrifugation, and the like. The precipitate is then washed and dried to give a samarium-iron based (hydr)oxide. Further, the samarium-iron based (hydr)oxide powder is obtained by roughly milling the powder with a blade mill and the like and finely pulverizing the powder with a bead mill and the like.

Counter ions in the samarium salt and the iron salt include inorganic ions such as chloride ions, sulfate ions, nitrate ions, and the like, and organic ions such as an alkoxide.

Examples of the solvent included in the solution containing the samarium salt and the iron salt include water, an organic solvent such as ethanol and the like.

Examples of alkali include hydroxides of alkali metals and alkaline earth metals, ammonia and the like.

In addition, instead of the precipitating agent, a precursor of the precipitating agent that is decomposed by external action such as heat of urea and the like and becomes a precipitating agent, may be used.

A hot air oven or a vacuum dryer may be used to dry the cleaned precipitate.

After producing the precursor powder of the samarium-iron based alloy, the process is performed using a glovebox and the like without exposure to the atmosphere.

[Pre-Reduction]

When the precursor powder of the samarium-iron based alloy contains an iron oxide or an iron compound, pre-reduction to a samarium-iron based oxide powder is preferred prior to reduction-diffusion of the precursor powder of the samarium-iron based alloy. Thus, the particle size of the samarium-iron-based alloy powder can be reduced.

The samarium oxide-iron based powder means a powder containing samarium oxide and iron.

A method of pre-reducing the precursor powder of a samarium-iron based alloy includes, but is not particularly limited to, a method of heat treating the precursor powder of a samarium-iron based alloy at a temperature of 400° C. or more in a reducing atmosphere such as hydrogen.

For example, in order to obtain the samarium-iron based alloy powder having an average particle size of 1.0 μm or less, the samarium-iron (hydr)oxide powder is pre-reduced from 500° C. to 800° C.

[First Reduction-Diffusion]

A method of reduction-diffusion a samarium oxide-iron based powder under an inert gas atmosphere includes, but is not particularly limited to, a method of mixing calcium or calcium hydride with a samarium oxide-iron based powder and then heating the powder to a temperature (about 850° C.) that is equal to or greater than the melting point of calcium. At this time, samarium reduced by calcium diffuses into the calcium melt and reacts with iron and the like, forming a samarium-iron based alloy powder.

There is a correlation between the temperature of the reduction-diffusion and the particle size of the samarium-iron based alloy powder, and the higher reduction-diffusion temperature produced the larger particle size of the samarium-iron based alloy powder.

For example, in order to obtain the samarium-iron based alloy powder having an average particle size of 1.0 μm or less, the samarium-iron based powder is synthesized at 850° C. to 950° C. under an inert gas atmosphere for about 1 minute to about 2 hours.

As the reduction-diffusion progresses, crystallization of the samarium-iron based oxide powder progresses to form the main phase having a $Th_2Zn_{17}$ or $TbCu_7$ structure. At this time, a samarium-rich phase is formed on the surface of the main phase, which contains samarium and iron and has an atomic ratio of samarium to iron greater than that of the main phase.

[Second Reduction-Diffusion]

A method of a reduction-diffusion of a mixture of a samarium-iron-based alloy powder and one or more compounds selected from the group consisting of a zirconium compound, a molybdenum compound, a vanadium compound, a tungsten compound, and a titanium compound under an inert gas atmosphere is not particularly limited. However, there is a method of mixing calcium or calcium hydride with the above-described mixture and heating the mixture to a temperature (about 850° C.) at or above a melting point of calcium. At this time, one or more elements selected from the group consisting of zirconium, molybdenum, vanadium, tungsten, and titanium reduced by calcium diffuse in the calcium melt and react with the samarium-rich phase, thereby forming a sub-phase.

In addition to one or more compounds selected from the group consisting of a zirconium compound, a molybdenum compound, a vanadium compound, a tungsten compound, and a titanium compound, the samarium compound, an iron compound, may be reduced, thereby forming a sub-phase.

Examples of zirconium compounds include zirconium chloride, zirconium sulfide, zirconium oxide, and the like.

Examples of molybdenum compounds include molybdenum chloride, ammonium molybdate, molybdenum oxide, and the like.

Examples of vanadium compounds include vanadium chloride, ammonium vanadate, vanadium oxide, and the like.

Examples of tungsten compounds include tungsten chloride, ammonium tungstate, vanadium oxide, and the like.

Examples of titanium compounds include titanium oxide, titanium alkoxide, and titanium chloride.

A method of preparing a mixture of a samarium-iron based alloy powder and one or more compounds selected from the group consisting of a zirconium compound, a molybdenum compound, a vanadium compound, a tungsten compound, and a titanium compound, includes, for example, a method of dissolving the above-described compounds in a solvent and then coating the samarium-iron based alloy powder with the above-described compounds, and the like.

The solvent includes 2-propanol and the like, but is not limited to, as long as the above-described compound can be dissolved.

[Nitriding]

The process of nitriding the samarium-iron based alloy powder includes, but is not limited to, a process of heat treating the samarium-iron based alloy powder at a temperature of 300° C. to 500° C. under an atmosphere such as ammonia, a mixture of ammonia and hydrogen, nitrogen, a mixture of nitrogen and hydrogen, and the like.

The main phase composition of samarium-iron-nitrogen based magnet powder is optimally $Sm_2Fe_{17}N_3$ because of its high magnetic properties.

Incidentally, when ammonia is used, the samarium-iron based alloy powder can be nitrided in a short time, but the nitrogen content in the samarium-iron-nitrogen based magnet powder may be higher than the optimum value. In this case, excessive nitrogen can be discharged from the crystal lattice by annealing the samarium-iron-nitrogen based magnet powder in hydrogen, thereby the nitrogen content of the samarium-iron-nitrogen based magnet powder was optimized.

For example, the samarium-iron based alloy powder is heat treated at 350° C. to 450° C. for 10 minutes to 2 hours under a mixture of ammonia and hydrogen, then switched to a stream of hydrogen and annealed at 350° C. to 450° C. for 30 minutes to 2 hours.

[Washing]

Because a crude product of the samarium-iron-nitrogen based magnet powder contains a calcium compound such as calcium oxide, unreacted calcium metal, nitrided calcium produced by nitriding calcium metal, calcium hydride and the like, the calcium compound is washed with a solvent capable of dissolving.

Examples of the solvent capable of dissolving the calcium compound include, but are not limited to, water, alcohol, and the like. Of these, water is preferred in terms of cost and solubility of the calcium compound.

For example, the crude product of the samarium-iron-nitrogen based magnet powder may be added to water, and the calcium compound can be removed by repeating agitation and decantation.

Before nitriding the samarium-iron based alloy powder, the samarium-iron based alloy powder may be washed with a solvent capable of dissolving the calcium compound.

[Vacuum Drying]

The crude product of the washed samarium-iron-nitrogen based magnet powder is preferably dried in a vacuum to remove solvents capable of dissolving the calcium compound.

Preferably, the temperature at which the crude product of the cleaned samarium-iron-nitrogen based magnet powder is dried in a vacuum is from room temperature to 100° C. Therefore, it is possible to inhibit the oxidation of the crude product of the cleaned samarium-iron-nitrogen based magnet powder.

The crude product of the cleaned samarium-iron-nitrogen based magnet powder may be replaced with an organic solvent that is highly volatile, such as alcohols, and can be miscible with water, and then dried in a vacuum.

[Dehydrogenation]

When washing the crude product of samarium-iron-nitrogen based magnet powder, hydrogen may enter the crystal lattice. In this case, it is preferable to dehydrogenate of the washed samarium-iron-nitrogen based magnet powder.

Examples of the method of dehydrogenating the crude product of the washed samarium-iron-nitrogen based magnet powder include, but are not limited to, a method of heat treating the crude product of the washed samarium-iron-nitrogen based magnet powder in a vacuum or in an inert gas atmosphere.

For example, the crude product of the washed samarium-iron-nitrogen based magnet powder is heat treated at 150° C. to 450° C. for 0 to 1 hour under an argon stream.

[Disintegration]

The crude product of the washed samarium-iron-nitrogen based magnet powder may be crushed. This improves the residual magnetization and the maximum energy product of the samarium-iron-nitrogen based magnet powder.

For example, a jet mill, a dry and wet ball mill, a vibration mill, a medium agitation mill, or the like is used to crush the crude product of the washed samarium-iron-nitrogen based magnet powder under a weaker condition than pulverization. Here, a condition weaker than pulverization means a condition that does not pulverize the crude product of the washed samarium-iron-nitrogen based magnet powder. For example, when a jet mill is used, the gas flow rate and the flow speed are controlled.

The samarium-iron based alloy powder may be crushed instead of the crude product of the washed samarium-iron-nitrogen based magnet powder.

Here, it is preferable not to pulverize after preparing the samarium-iron base alloy powder. For example, when the samarium-iron based alloy powder, in which the samarium-rich phase is formed on the surface of the main phase, is pulverized, a portion of the surface of the particles becomes a fracture surface, and the coverage of the main phase surface by the samarium-rich phase is reduced.

[Method for Manufacturing Samarium-Iron-Nitrogen Based Magnet]

The samarium-iron-nitrogen based magnet of the present embodiment can be manufactured using the samarium-iron-nitrogen based magnet powder of the present embodiment.

For example, a samarium-iron-nitrogen based sintered magnet is obtained by sintering a samarium-iron-nitrogen based magnet powder after the samarium-iron-nitrogen based magnet powder is molded into a predetermined shape.

[Molding]

The samarium-iron-nitrogen based magnet powder may be molded while applying a magnetic field in forming the samarium-iron-nitrogen based magnet powder. As a result, an anisotropic magnet with high magnetic characteristics is obtained because the compact of the samarium-iron-nitrogen based magnet powder is oriented in a specific direction.

[Sintering]

The compact of the samarium-iron-nitrogen based magnet powder is sintered to yield a samarium-iron-nitrogen based magnet.

A method of sintering a compact of a samarium-iron-nitrogen based magnetic based powder includes, but is not limited to, a spark plasma method, a hot press method, and the like.

It is also possible to form the samarium-iron-nitrogen based magnetic based powder and to sinter the compact of the samarium-iron-nitrogen based magnet powder using the same apparatus.

[Samarium-Iron-Nitrogen Based Magnet]

The samarium-iron-nitrogen based magnet of the present embodiment contains a main phase comprising samarium and iron, a sub-phase comprising samarium, iron and one or more elements selected from the group consisting of zirconium, molybdenum, vanadium, tungsten and titanium, wherein an atomic ratio of a rare earth element to an iron group element is greater than an atomic ratio of a rare earth element to an iron group element of the main phase.

The samarium-iron-nitrogen based magnet in this embodiment can be either a sintered magnet or a bonded magnet.

FIG. 1 shows a samarium-iron-nitrogen based sintered magnet as an example of a samarium-iron-nitrogen based magnet.

The samarium-iron-nitrogen based sintered magnet 10 contains a main phase 11 containing samarium and iron, and a sub-phase 12 containing samarium, iron, and one or more elements selected from the group consisting of zirconium, molybdenum, vanadium, tungsten and titanium, wherein the atomic ratio of the rare earth element to the iron group element is greater than the atomic ratio of the rare earth element to the iron-based element of the main phase 11. Here, the sub-phase 12 is present in the boundary region of the adjacent main phase 11.

Figure 2:
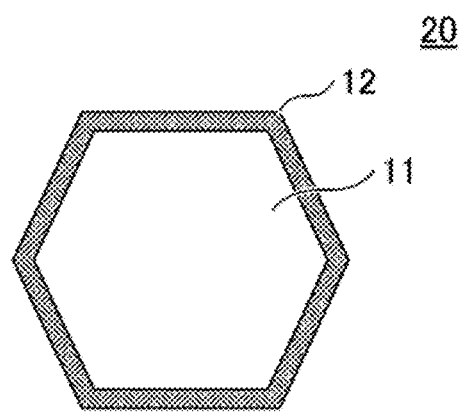
FIG. 2 is a schematic diagram showing a samarium-iron-nitrogen based magnet powder used in manufacturing a samarium-iron-nitrogen based magnet.

It should be noted that the samarium-iron-nitrogen based sintered magnet 10 can be manufactured using the samarium-iron-nitrogen based magnet powder 20 (see FIG. 2) on which the surface of the main phase 11 is covered by the sub-phase 12.

EXAMPLE

Hereinafter, examples of the present invention will be described, but the present invention is not limited to the following examples.

Example 1

(Preparation of Samarium-Iron (Hydr)Oxide Powder)

Sixty-five grams of iron nitrate enneahydrate and thirteen grams of samarium nitrate hexahydrate were dissolved in 800 ml of water, and 120 ml of 2 mol/L potassium hydroxide solution was added dropwise while stirring, stirred at room temperature overnight to produce a suspension. The suspension was filtered, the filter washed, and then dried overnight at 120° C. in air using a hot air drying oven to make a sample. Samples were roughly crushed by a blade mill followed by pulverization in ethanol by a rotating mill using stainless balls. After centrifugation, it was dried in a vacuum to produce a samarium-iron (hydr)oxide powder.

The following steps were performed in a glove box without exposure to the air under argon atmosphere.

(Pre-Reduction)

A samarium-iron (hydr)oxide powder was pre-reduced by heat treatment at 700° C. in a hydrogen gas stream for 6 hours, and produced samarium oxide-iron powder.

(First Reduction-Diffusion)

After 5 g of samarium oxide-iron powder and 2.5 g of calcium were placed in an iron crucible, reduction-diffusion was caused by heating the powder at 900° C. for 1 hour, and a samarium-iron alloy powder in which the samarium-rich phase was formed on the surface of the main phase was produced. Here, excess calcium is added to the samarium-iron alloy powder so that the calcium required for the reduction-diffusion in the next process remains.

(Second Reduction-Diffusion)

One gram of samarium-iron alloy powder was added to a solution of 91 mg of zirconium chloride ($ZrCl_4$) in 15 ml of 2-propanol, and the solution was stirred for 30 minutes, and then dried in a vacuum. A mixture of zirconium chloride and samarium-iron alloy powder was then placed in an iron crucible and heated the powder at 850° C. to reduce and diffuse the zirconium, thereby forming a sub-phase.

(Nitriding)

After the samarium-iron alloy powder was cooled to room temperature, the atmosphere was replaced by a hydrogen atmosphere, and the temperature was raised to 380° C. The samarium-iron alloy powder was then nitrided, and a crude product of the samarium-iron-nitrogen magnet powder was produced by switching the hydrogen atmosphere to a 1:2 ammonia-hydrogen mixture in a volume ratio, raising the temperature to 420° C., and holding it for 1 hour. Furthermore, the nitrogen content of the samarium-iron-nitrogen magnet powder was optimized by being annealed at 420° C. for 1 hour in hydrogen, and then by being annealed at 420° C. for 0.5 hours in argon.

(Washing)

The crude product of the samarium-iron-nitrogen magnet powder was washed five times with pure water to remove the calcium compound.

(Vacuum Drying)

Water remaining in the crude product of the washed samarium-iron-nitrogen magnet powder was replaced with 2-propanol and then dried in a vacuum at room temperature.

(Dehydrogenation)

The crude product of the dried samarium-iron-nitrogen magnet powder was dehydrogenated in a vacuum at 200° C. for 3 hours, and produced a samarium-iron-nitrogen magnet powder.

Examples 2, 3

A samarium-iron-nitrogen magnet powder was prepared in the same manner as Example 1, except that the amount of added zirconium chloride was changed to 45 mg and 227 mg, respectively, in the second reduction-diffusion.

Example 4

In production of the samarium-iron (hydr)oxide powder, a samarium-iron-nitrogen magnet powder was produced in the same manner as Example 1, except that 58 g of iron nitrate enneahydrate and 5 g of cobalt nitrate hexahydrate were used instead of 65 g of iron nitrate enneahydrate.

Comparative Example 1

A samarium-iron-nitrogen magnet powder was produced in the same manner as Example 1, except that the second reduction-diffusion was not performed.

Comparative Example 2

After the first reduction-diffusion, the samarium-iron alloy powder was washed with pure water, and the calcium compound was removed. The washed samarium-iron alloy powder was then washed with aqueous acetic acid at pH 5.5 for 15 minutes, thereby removing the samarium-rich phase.

In the second reduction-diffusion, the samarium-iron-nitrogen magnet powder was produced in the same manner as Example 1 except that the samarium-iron alloy powder in which the samarium-rich phase was removed was used and calcium was added.

Comparative Examples 3 and 4

A samarium-iron-nitrogen magnet powder was produced in the same manner as Example 1 except that 52 mg of aluminum chloride ($AlCl_3$) and 62 mg of chromium chloride ($CrCl_3$) were used instead of zirconium chloride in the second reduction-diffusion.

Comparative Example 5

A samarium-iron-nitrogen magnet powder was produced in the same manner as Example 1, except that the following treatment was performed instead of the second reduction-diffusion.

A 36 mg of zirconium powder and 1 g of samarium-iron alloy powder were mixed in 2-propanol by ball mill for 6 hours, then dried in a vacuum. A mixture of zirconium powder and samarium-iron alloy powder was then placed in an iron crucible and was heat treated at 730° C., thereby forming a sub-phase.

Example 5

In the second reduction-diffusion, a samarium-iron-nitrogen magnet powder was produced in the same manner as in Example 1, except that 2-propanol was not used and heated at 900° C.

Example 6

In the second reduction-diffusion, the samarium-iron-nitrogen magnet powder was produced in the same manner as Example 1, except that the stirring time was changed to 60 minutes.

Example 7

In the second reduction-diffusion, the samarium-iron-nitrogen magnet powder was produced in the same manner as Example 2 except that zirconium chloride and a samarium-iron alloy powder were placed in an iron crucible and heated at 900° C.

Example 8

In the production of the samarium-iron (hydo)oxide powder, a samarium-iron-nitrogen magnet powder was prepared in the same manner as Example 1, except that the amount of additional iron nitrate enneahydrate and samarium nitrate hexahydrate was changed to 65 g and 11 g, respectively.

Example 9

In the preparation of the samarium-iron (hydro)oxide powder, the samarium-iron-nitrogen magnet powder was produced in the same manner as Example 1, except that the amount of additional iron nitrate enneahydrate and samarium nitrate hexahydrate was changed to 65 g and 10 g, respectively.

Then, the main and sub-phases of the samarium-iron-nitrogen magnet powder were analyzed.

[Main Phase]

A portion of the samarium-iron-nitrogen magnet powder of Examples 1 to 9 and Comparative Examples 1 to 5 was taken, and the X-ray diffraction (XRD) spectrum was measured. It was confirmed that both powders had the main phase structure $Th_2Zn_{17}$. Also, from the XRD spectral peak positions, the samarium-iron-nitrogen magnet powder of Examples 1 to 9 and Comparative Examples 1 to 5 confirmed that the lattice constant of the main phase is appropriate for each powder, that is, the nitridation amount of the main phase is appropriate.

[Sub-Phase]

A portion of the samarium-iron-nitrogen magnet powder was collected, mixed with a thermosetting epoxy resin, and heat-solidified. Then, a cross section was exposed by irradiating the powder with a focused ion beam (FIB) and etching the powder, and a sample was produced. The sample was observed using a field emission scanning electron microscope (FE-SEM). Specifically, the composition of the principal and sub-phases was analyzed by energy dispersive x-ray spectroscopy (EDS). Here, the main phase and the sub-phase can be distinguished by FE-SEM reflective electron image or EDS mapping. If the sub-phase is particularly thin, a scanning transmission electron microscope (STEM) is required, but this is not necessary in the present embodiment. Here, the composition of the main phase and the sub-phase was calculated by performing 20 point analyses for each sample and using the ratio of the composition of samarium, iron, and zirconium as the average value. The zirconium content in the main phase was 0.1 at % or less, and zirconium was substantially absent in the main phase.

Figure 3:
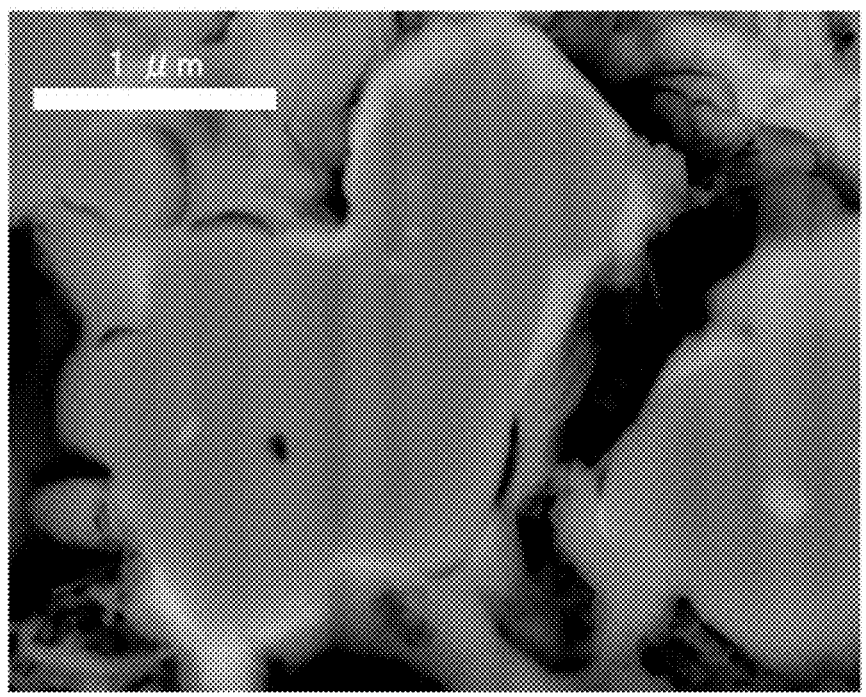
FIG. 3 is an FE-SEM reflective electron image of a cross-section of the samarium-iron-nitrogen magnet powder of Example 1.

FIG. 3 shows the FE-SEM reflection electron image of the cross section of the samarium-iron-nitrogen magnet powder of Example 1. From FIG. 3, it can be seen that the samarium-iron-nitrogen magnet powder of Example 1 has a core-shell structure having a main phase as a core and a sub-phase as a shell. Here, in FIG. 3, the gray portion is the main phase and the white portion is the sub-phase.

Incidentally, the coverage of the surface of the main phase by the sub-phase was calculated as the ratio of the length of the periphery of the main phase to the length of the periphery of the main phase in the cross section of the samarium-iron-nitrogen magnet powder observed in the FE-SEM reflection electron image as the average value of 20 samarium-iron-nitrogen magnet powder. In addition, when the samarium-iron-nitrogen magnet powder was sintered by interparticle sintering, the coverage proportion of the surface of the main phase by the sub-phase was calculated by using the samarium-iron-nitrogen magnet powder sintered by interparticle sintering as one samarium-iron-nitrogen magnet powder.

In addition, the arithmetic mean value of a diameter of the circle equivalent diameter of 50 randomly selected particles from the surface of the samarium-iron-nitrogen magnet powder was 0.95 μm.

Table 1 summarizes Sm[at %], Fe+Co[at %], Zr[at %], and Sm/(Fe+Co) as the compositions of the sub-phases of the samarium-iron-nitrogen magnet powder of Examples 1 to 9 and Comparative Examples 1 to 5, and Sm[at %], Fe+Co[at %], and Sm/(Fe+Co) as the compositions of the main phases. In addition, the coverage of the surface of the main phase by the sub-phase [%] and the coercivity [kA/m] after a heat treatment at 500° C. are also described.

The coercivity was then measured after a heat treatment of the samarium-iron-nitrogen magnet powder at 500° C.

[Magnetic Force after a Heat Treatment at 500° C.]

A portion of the samarium-iron-nitrogen magnet powder was collected, heat treated under a vacuum at 500° C. for 5 minutes using a heat treatment apparatus installed in a glove box, then mixed with the thermoplastic resin, and oriented in a magnetic field of 1592 kA/mm, thereby producing a bond magnet. Next, a bonded magnet was installed in the axial direction of easy magnetization at a temperature of 27° C., under a maximum applied magnetic field of 7162 kA/m, while using a vibration sample magnetometer (VSM), and the coercivity was measured.

Table 1 shows the results of the measurement of the coercive force after a heat treatment of the samarium-iron-nitrogen magnet powder at 500° C.

TABLE 1

| | COMPOSITION OF SUB-PHASE | | | | COMPOSITION OF MAIN PHASE | | | COVERAGE PROPORTION FOR MAIN PHASE | COERCIVE FORCE AFTER HEAT TREATMENT |
|---|---|---|---|---|---|---|---|---|---|
| | Sm [at %] | Fe + Co [at %] | Zr [at %] | Sm/ (Fe + Co) | Sm [at %] | Fe + Co [at %] | Sm/ (Fe + Co) | SURFACE BY SUBPHASE [%] | AT 500° C. [kA/m] |
| EXAMPLE 1 | 46 | 40 | 14 | 1.15 | 11 | 89 | 0.12 | 55 | 810 |
| EXAMPLE 2 | 48 | 45 | 7 | 1.07 | 11 | 89 | 0.12 | 51 | 774 |

TABLE 1-continued

| | COMPOSITION OF SUB-PHASE | | | | COMPOSITION OF MAIN PHASE | | | COVERAGE PROPORTION FOR MAIN PHASE | COERCIVE FORCE AFTER HEAT TREATMENT |
|---|---|---|---|---|---|---|---|---|---|
| | Sm [at %] | Fe + Co [at %] | Zr [at %] | Sm/ (Fe + Co) | Sm [at %] | Fe + Co [at %] | Sm/ (Fe + Co) | SURFACE BY SUBPHASE [%] | AT 500° C. [kA/m] |
| EXAMPLE 3 | 44 | 36 | 20 | 1.22 | 11 | 89 | 0.12 | 58 | 954 |
| EXAMPLE 4 | 47 | 39 | 14 | 1.21 | 11 | 89 | 0.12 | 56 | 820 |
| EXAMPLE 5 | 46 | 40 | 14 | 1.15 | 11 | 89 | 0.12 | 10 | 745 |
| EXAMPLE 6 | 48 | 42 | 10 | 1.14 | 11 | 89 | 0.12 | 79 | 844 |
| EXAMPLE 7 | 49 | 46 | 5 | 1.07 | 11 | 89 | 0.12 | 5 | 715 |
| EXAMPLE 8 | 27 | 54 | 19 | 0.50 | 11 | 89 | 0.12 | 54 | 776 |
| EXAMPLE 9 | 24 | 57 | 19 | 0.42 | 11 | 89 | 0.12 | 52 | 727 |
| COMPARATIVE EXAMPLE 1 | 54 | 46 | 0 | 1.17 | 11 | 89 | 0.12 | 40 | 692 |
| COMPARATIVE EXAMPLE 2 | 5 | 76 | 19 | 0.07 | 11 | 89 | 0.12 | 9 | 517 |
| COMPARATIVE EXAMPLE 3 | 54 | 46 | 0 | 1.17 | 11 | 89 | 0.12 | 45 | 415 |
| COMPARATIVE EXAMPLE 4 | 52 | 48 | 0 | 1.08 | 11 | 89 | 0.12 | 13 | 572 |
| COMPARATIVE EXAMPLE 5 | 5 | 63 | 32 | 0.08 | 11 | 89 | 0.12 | 37 | 279 |

From Table 1, it can be seen that the samarium-iron-nitrogen magnet powder of Examples 1 to 9 has a coercive force of 700 kA/m or more after a heat treatment at 500° C.

In contrast, because the samarium-iron-nitrogen magnet powder of Comparative Examples 1, 3, and 4 has a sub-phase that does not contain one or more elements selected from the group consisting of zirconium, molybdenum, vanadium, tungsten and titanium, the coercivity force after a heat treatment at 500° C. is low.

In addition, the samarium-iron-nitrogen magnet powder of Comparative Examples 2 and 5 has a lower coercivity after the heat treatment at 500° C. because the ratio of the atomic number of samarium to that of the sub-phase iron is smaller than that of the main phase. Here, the coercivity of the samarium-iron-nitrogen magnet powder of Comparative Example 5 after a heat treatment at 500° C. is particularly low, which is considered to be due to the deposition of the $ZrFe_2$ phase, which is a soft magnetic phase, from the composition ratio of the sub-phase Fe and Zr.

Examples 10 to 13

In the second reduction-diffusion, a samarium-iron-nitrogen magnet powder was produced in the same manner as Example 7 except that instead of zirconium chloride, 266 mg of molybdenum chloride ($MoCl_5$), 153 mg of vanadium chloride ($VCl_3$), 386 mg of tungsten chloride ($WCl_6$), and 78 mg of titanium oxide ($TiO_2$) were used, respectively.

Table 2 shows the results of the measurement of the coercive force after the heat treatment of samarium-iron-nitrogen magnet powder at 500° C. In Table 2, M means Mo, V,

TABLE 2

| | COMPOSITION OF SUB-PHASE | | | | COMPOSITION OF MAIN PHASE | | | COVERAGE PROPORTION FOR MAIN PHASE | COERCIVE FORCE AFTER HEAT TREATMENT |
|---|---|---|---|---|---|---|---|---|---|
| | Sm [at %] | Fe + Co [at %] | M [at %] | Sm/ (Fe + Co) | Sm [at %] | Fe + Co [at %] | Sm/ (Fe + Co) | SURFACE BY SUBPHASE [%] | AT 500° C. [kA/m] |
| EXAMPLE 10 | 42 | 33 | 25 | 1.27 | 11 | 89 | 0.12 | 20 | 832 |
| EXAMPLE 11 | 44 | 32 | 24 | 1.38 | 11 | 89 | 0.12 | 21 | 803 |
| EXAMPLE 12 | 41 | 34 | 25 | 1.21 | 11 | 89 | 0.12 | 22 | 801 |
| EXAMPLE 13 | 43 | 33 | 24 | 1.30 | 11 | 89 | 0.12 | 20 | 820 |

From Table 2, it can be seen that the coercivity force of the samarium-iron-nitrogen magnet powder of Examples 10 to 13 after the heat treatment at 500° C. is 700 kA/m or more.

A portion (about 0.1 g) of the samarium-iron-nitrogen magnet powder was then collected, and the oxygen content was measured by an inert gas melting-non-dispersive infrared absorption method (NDIR).

Table 3 shows the measured oxygen content of a samarium-iron-nitrogen magnet powder.

TABLE 3

| | OXYGEN CONTENT [% BY MASS] |
|---|---|
| EXAMPLE 3 | 0.8 |
| EXAMPLE 10 | 0.9 |
| EXAMPLE 11 | 0.9 |
| EXAMPLE 12 | 1.2 |

TABLE 3-continued

| | OXYGEN CONTENT [% BY MASS] |
|---|---|
| EXAMPLE 13 | 1.0 |
| COMPARATIVE EXAMPLE 1 | 2.0 |

Table 3 shows that the samarium-iron-nitrogen magnet powder of Examples 3, 10 to 13 has a low oxygen content.

In contrast, the samarium-iron-nitrogen magnet powder of Comparative Example 1 does not perform the second reduction-diffusion and therefore has a high oxygen content.

Next, a samarium-iron-nitrogen sintered magnet was then produced using a samarium-iron-nitrogen magnet powder.

[Production of Samarium-Iron-Nitrogen Sintered Magnet]

In the present example, isotropic samarium-iron-nitrogen sintered magnets were made. Specifically, 0.5 g of samarium-iron-nitrogen magnet powder was filled into a 5.5 mm by 5.5 mm hard metal rectangular die in a glove box, and then placed in a spark plasma sintering device including a pressurizing mechanism by a servo-controlled press device without harming the atmosphere. Next, a samarium-iron-nitrogen sintered magnet was produced by sintering for 1 minute under a condition of a pressure of 1200 MPa and a temperature of 500 degrees Celsius with the inside of a spark plasma sintering device kept at a vacuum (a pressure of 2 Pa or less and an oxygen concentration of 0.4 ppm or less). Then, after returning to atmospheric pressure with an inert gas, the temperature fell to 60° C. or less, and the samarium-iron-nitrogen sintered magnet was taken out of the atmosphere.

The cross-section of the samarium-iron-nitrogen sintered magnet was observed using a transmission electron microscope (TEM), and confirmed that the composition of the sub-phase, the composition of the main phase, and the coverage of the main phase by the sub-phase were equivalent to those of the samarium-iron-nitrogen magnet powder.

The coercive force of the samarium-iron-nitrogen sintered magnet was then measured.

[Coercive Force]

The coercive force of the samarium-iron-nitrogen sintered magnet was measured using a vibration sample magnetometer (VSM) at a temperature of 27° C. and a maximum applied magnetic field of 7162 kA/m.

Table 4 shows the results of the measurement of the coercive force of the samarium-iron-nitrogen sintered magnet.

TABLE 4

| | COERCIVE FORCE [kA/m] |
|---|---|
| EXAMPLE 1 | 820 |
| EXAMPLE 3 | 963 |
| EXAMPLE 12 | 804 |
| COMPARATIVE EXAMPLE 1 | 690 |

From Table 4, it can be seen that the samarium-iron-nitrogen sintered magnet manufactured using the samarium-iron-nitrogen magnet powder of Examples 1, 3 and 12 has a coercive force of 700 kA/m or more.

In contrast, the magnetic coercive force of the samarium-iron-nitrogen sintered magnet manufactured using the samarium-iron-nitrogen magnet powder of Comparative Example 1 is low.

The oxygen content of the samarium-iron-nitrogen sintered magnet was then measured by an inert gas melting-non-dispersive infrared absorption (NDIR) method.

Table 5 shows the measured oxygen content of the samarium-iron-nitrogen sintered magnet.

TABLE 5

| | OXYGEN CONTENT [% BY MASS] |
|---|---|
| EXAMPLE 3 | 0.8 |

From Table 5, it can be seen that the samarium-iron-nitrogen sintered magnet made using the samarium-iron-nitrogen magnet powder of Example 3 has a low oxygen content.

INDUSTRIAL APPLICABILITY

Because a samarium-iron-nitrogen magnet powder has a high Curie temperature and a small change in coercive force with respect to a temperature relative to a neodymium magnet, it is possible to manufacture a magnet having both high magnetic properties and heat resistance. For example, such magnets can be used as raw materials for sintered magnets and bonded magnets used for motors, sensors and the like which are mounted on household appliances such as air conditioners, production robots, automobiles and the like, which require high magnetic properties and heat resistance.

This application claims priority to Priority Application No. 2018-065356, filed Mar. 29, 2018 with the Japan Patent Office, the entire contents of which are hereby incorporated by reference.

The invention claimed is:

1. A samarium-iron-nitrogen based magnet powder, comprising:
    a main phase containing samarium and iron; and
    a sub-phase containing samarium, iron, and zirconium,
    wherein an atomic ratio of a rare earth element to an iron group element is greater than an atomic ratio of the rare earth element to the iron group element of the main phase,
    wherein at least a part of a surface of the main phase is coated with the sub-phase
    wherein oxygen content of the samarium-iron-nitrogen based magnet powder is in a range from 0.8% by mass to 1.2% by mass, and
    wherein the sub-phase has the atomic ratio of the rare earth elements to the iron group elements is 0.50 or more.

2. The samarium-iron-nitrogen magnet powder as claimed in claim 1, wherein a surface coverage of the main phase by the sub-phase is 10% or more.

3. The samarium-iron-nitrogen magnet powder as claimed in claim 1, wherein the sub-phase contains 24 at % or more and 49 at % or less of samarium, 32 at % or more and 57 at % or less of iron and cobalt, and 5 at % or more and 20 at % or less of zirconium.

4. The samarium-iron-nitrogen magnet powder as claimed in claim 1, wherein an average particle size of the samarium-iron-nitrogen based magnet powder is not more than 1.0 μm.

5. A method of manufacturing a samarium-iron-nitrogen magnet powder as claimed in claim 1, comprising:

producing a samarium-iron-nitrogen based magnet powder by reduction-diffusion of a precursor powder of a samarium-iron based alloy under an inert gas atmosphere;

forming a sub-phase by reduction-diffusion of a mixture of the samarium-iron based alloy powder and one or more compounds selected from the group consisting of a zirconium compound, a molybdenum compound, a vanadium compound, a tungsten compound, and a titanium compound under an inert gas atmosphere;

nitriding the sub-phase-formed samarium-iron based alloy powder; and further comprising:

washing a samarium-iron-based alloy powder having the sub-phase formed samarium-iron based alloy powder or the nitrided samarium-iron-based alloy-based powder with a solvent capable of dissolving a calcium compound.

6. A samarium-iron-nitrogen based magnet, comprising:
a main phase containing samarium and iron; and
a sub-phase containing samarium, iron, and zirconium, wherein an atomic ratio of a rare earth element to an iron group element is greater than an atomic ratio of the rare earth element to the iron group element of the main phase wherein oxygen content of a samarium-iron-nitrogen based magnet powder is in a range from 0.8% by mass to 1.2% by mass, and wherein the sub-phase has the atomic ratio of the rare earth elements to the iron group elements is 0.50 or more.

7. The samarium-iron-nitrogen based magnet as claimed in claim 6, wherein the sub-phase contains 24 at % or more and 49 at % or less of samarium, 32 at % or more and 57 at % or less of iron and cobalt, and 5 at % or more and 20 at % or less of zirconium.

8. The samarium-iron-nitrogen based magnet as claimed in claim 6, wherein an average particle size of a samarium-iron-nitrogen based magnet powder is not more than 1.0 µm.

* * * * *